United States Patent [11] 3,610,967

[72] Inventor Thomas L. Palfi
Mountainview, Calif.
[21] Appl. No. 15,004
[22] Filed Feb. 27, 1970
[45] Patented Oct. 5, 1971
[73] Assignee International Business Machines
Corporation
Armonk, N.Y.

[54] INTEGRATED MEMORY CELL CIRCUIT
4 Claims, 15 Drawing Figs.

[52] U.S. Cl. ........ 307/304, 317/235 R, 317/235 G, 307/238, 307/279, 307/304, 340/173
[51] Int. Cl. ........ H01l 19/00
[50] Field of Search ........ 317/235, 22.2; 307/205, 238, 251, 279, 303, 304; 340/173

[56] References Cited
UNITED STATES PATENTS

| | | | |
|---|---|---|---|
| 3,264,493 | 8/1966 | Price | 317/235 |
| 3,505,573 | 4/1970 | Wiedmann | 317/235 |
| 3,510,849 | 5/1970 | Igarashi | 340/173 |

OTHER REFERENCES

IBM Tech. Discl. Bul. " Use of a Buried Layer for Low-Power FET Cells" by Gladu Vol. 11, No. 10, March 1969 page 12118 317/235

IBM Tech. Discl. Bul. " FET Memory Cell Using Diodes as Load Devices" by Dennard et al. Vol. 11, No. 6, Nov. 1968 pages 592- 593 317/235

*Primary Examiner*—Jerry D. Craig
*Attorneys*—Robert S. Dunham, P. E. Henninger, Lester W. Clark, Thomas F. Moran, Gerald W. Griffin, Howard J. Churchill, R. Bradlee Boal, Christopher C. Dunham and John F. Ohlandt, Jr.

ABSTRACT: Method and means for constructing memory cell circuits, comprising the addition of a single diffusion to an IGFET wafer to form diodes in the drain or source regions of at least one of the FETS in the wafer, thus reducing the number of FETS in the cell and substantially reducing the area occupied by each cell. Three embodiments are disclosed, all using diodes as the input/output components of the cells and, in addition, one uses two diodes as the load, giving an exponential load characteristic, while another combines a diode and FET in the load to give a semiexponential load characteristic.

INVENTOR.
THOMAS L. PALFI
BY John F. Ohlandt
ATTORNEY

INTEGRATED MEMORY CELL CIRCUIT

BACKGROUND OF THE INVENTION

The present invention relates to the microelectronic art and more particularly to a method and means for constructing memory cell circuits using field effect transistors and diodes.

Memory cell cost estimates presently indicate that the fabrication of bipolar wafers is about one-fifth more expensive than the fabrication of IGFET wafers, even though the bipolar wafers go through five diffusion processes and the IGFET wafers only one. However, the ultimate product cost in memory bit bases is governed by the bit densities on the chip level so that the IGFET technology, which offers higher bit densities, has been significantly lower in cost.

Recent advances in bipolar technology have produced several cell designs which are closely competitive with IGFET densities and such features as lower power requirement and higher performance tend to favor bipolar technology. These bipolar cells, assuming Phase III geometry and single layer metallization, are approximately 15 mil. $^2$ in size. By contrast, the standard gated input IGFET cell, comprising six transistors, is approximately 10 mil.$^2$. Smaller IGFET cells, comprising four transistors, are being developed, but their success is dependent on several critical IGFET parameters.

In view of the cost relationships, it is of advantage to achieve reductions in the bit densities of the IGFET cells even though it is accomplished by using one or more diffusion steps in the process. Accordingly, the present invention recognizes that diodes may be created in the IGFET memory cell wafer, in addition to the conventionally formed FET transistors, by adding a single diffusion step and thus achieve higher bit densities.

SUMMARY OF THE INVENTION

The present invention comprises the formation of diodes by diffusion in the drain or source regions of at least one of the FETS in the standard six-transistor IGFET memory cell to thereby substantially reduce the area occupied by the memory cell wafer. More particularly, one diffusion may be added in the source region of the two bistable IGFETS, creating two diodes, each connected to the gate of the opposite IGFET and to a respective BIT/SENSE line, so as to act as the input/output components of the cell. The diodes are thus used for the BIT/SENSE line switching instead of transistors, reducing the content of the cell to four transistors and resulting in a cell area of approximately 4.5 mil.$^2$.

The cell may be further modified by creating additional diodes in the source regions of the bistable IGFETS. A double diode may be created while diffusing in each of these regions, which will act as the load, giving the cell an exponential load characteristic and reducing the total number of FETS in the cell to two, while decreasing the area of the cell to less than 5 mil.$^2$. Semiexponential load characteristics may be achieved by combining a diode and a FET in the load, that is, by creating additional diodes while diffusing, in the bistable FET source regions and connecting them to the gates of the two load FETS.

DESCRIPTION OF PREFERRED EMBODIMENTS

Figures 1, 2:
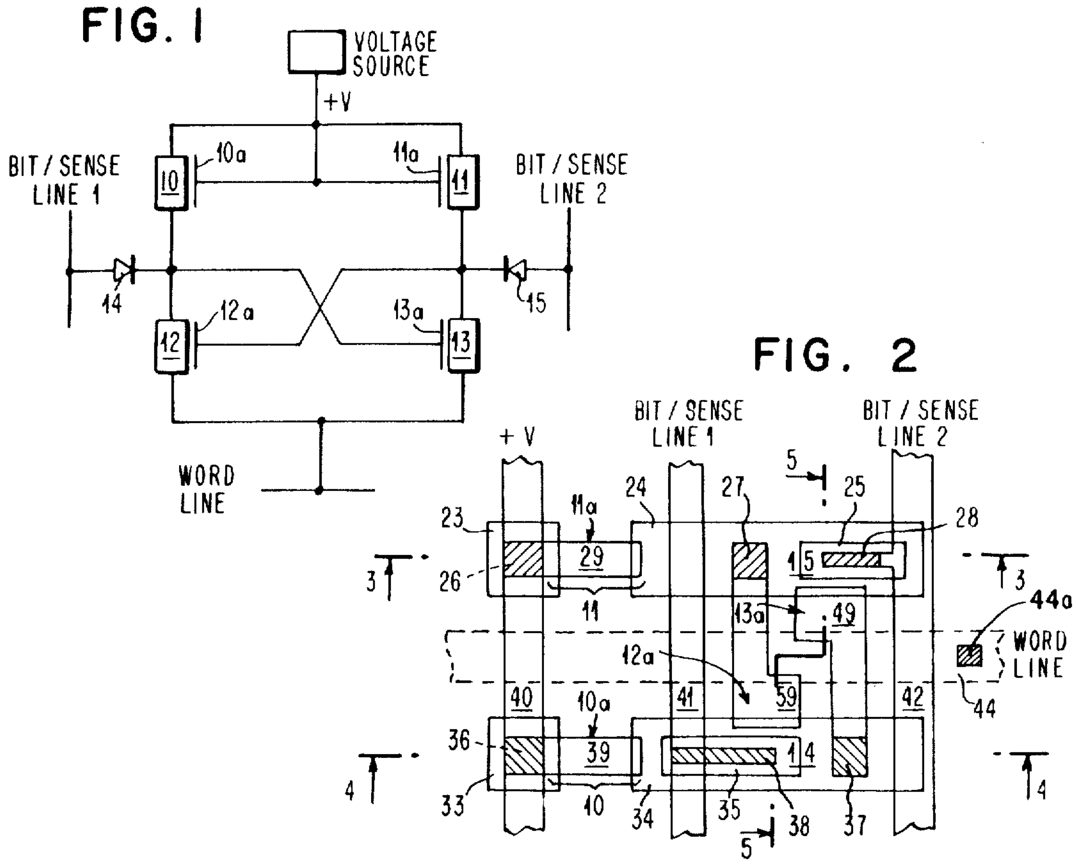
FIG. 1 is a schematic diagram of a memory cell circuit in accordance with the present invention.
FIG. 2 is a layout view of a semiconductor wafer containing the memory cell circuit shown in FIG. 1.

The circuit shown in FIG. 1 is a bistable memory cell comprising four insulated-gate field-effect transistors (IGFET,S) 10, 11, 12 and 13 and two diodes, 14 and 15. The diodes 14 and 15 are connected between the respective BIT/SENSE lines 1 and 2 and the legs of the bistable circuit and replace two INPUT/OUPUT IGFETs used in the standard six-transistor IGFET memory cell. The cathodes of the diodes 14 and 15 are connected to gates 13*a* and 12*a* of IGFETs 13 and 12, respectively, so tat the inputs from the diodes will control conduction through the IGFETs 12 and 13, which act as the bistable devices in the circuit. Respective gates 10*a* and 11*a* of IGFETs 10 and 11 are commonly connected to a positive bias voltage source (+V) so that these IGFETs 10 and 11 act as the load devices. The drains of IGFETs 12 aNd 13 are connected to the WORD LINE.

The circuit operates in a fixed positive supply, regulated common WORD LINE mode. During standby conditions, the WORD LINE is regulated to give the desired standby current, and since all transistors are in standard current mode during standby, the voltage drops across the load devices are slightly higher than the voltages $V_T$ on the cathode sides of the diodes. This sets the voltages on the cathode sides of the diodes below the positive supply voltage +V. When the WORD LINE is addressed by lowering its level, a larger voltage will be developed across the load on the conducting side until the appropriate diode fully conducts between the BIT/SENSE line load and the conducting bistable device in the memory cell. The memory cell bistability will be maintained by the load devices in the BIT/SENSE lines which will then act as if they were loads in the cell. The state of the cell can be read from the voltage difference across the BIT/SENSE lines.

The write operation of the cell may be difficult since the diodes are eliminating negative drive and the positive write operation may be power consuming unless push-pull drive and/or power supply line switching is employed.

The construction of the cell of FIG. 1 can be seen with reference to FIGS. 2 through 5. FIG. 2 is layout view of a semiconductor wafer or chip containing the various diffused regions and contacts arranged in accordance with the present invention. As seen in the sections in FIGS. 3 and 4, the wafer comprises a body or substrate 20 of semiconductor material, such as silicon, and has an insulating layer 21, preferably of silicon dioxide, which may be thermally grown on the planar surface 22 of the body 20, in a well-known manner. Body 20 may be doped with either N-type or P-type impurities but, by way of example, is shown as a P-type material formed by the diffusion of boron or indium.

Figure 3:
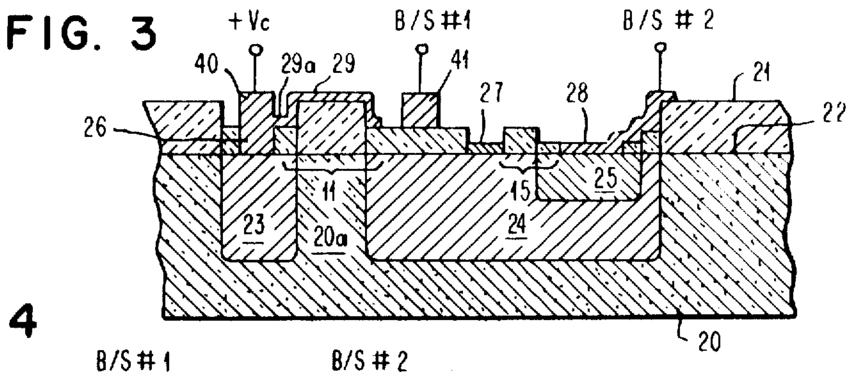
FIGS. 3 and 4 are sectional views through the wafer of FIG. 2 taken along the lines 3—3 and 4—4 respectively.

In the section shown in FIG. 3, regions of opposite conductivity, in this case N-type regions 23 and 24, are formed in the body 20 by the diffusion of an N-type impurity, such as antimony, arsenic or phosphorus, in a conventional manner. The N-type regions 23 and 24 extend into the body 20 from separate areas on its surface and the N-type region, 24, has a P-type region 25 formed therein entirely within its surface area. Respective contacts 26, 27 and 28 are attached to the surfaces of the regions 23, 24 and 25 through holes in the oxide layer 21 and a gate electrode 29 is formed over this insulating layer 21, above a region 20*a* of body 20, which is located between the juxtaposed sides of regions 23 and 24.

Figure 4:
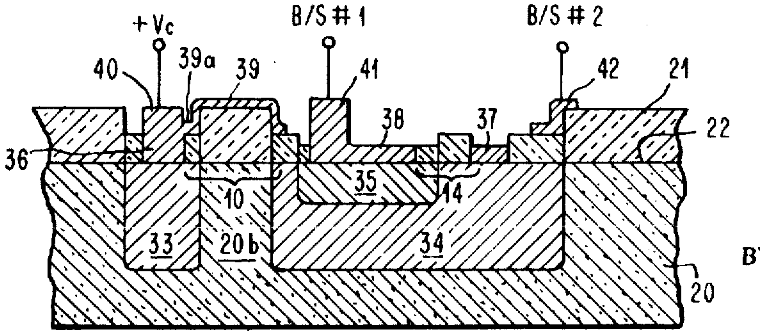

In the section shown in FIG. 4, corresponding N-type regions 33 and 34 are formed by diffusion extending into the body 20 from separate areas on its surface, and the N-type region 34 has a P-type region 35 formed therein entirely within its surface area. Respective contacts 36, 37 and 38 are similarly attached to the surfaces of the regions 33, 34 and 35 through holes in the oxide layer and a gate electrode 39 is formed over insulating layer 21, above a region 20*b* of body 20 which is located between the juxtaposed sides of regions 33 and 34.

Suitable conductors 40, and 41 and 42 are provided on the surface of the insulating layer to connect to the appropriate device contacts and are respectively connected to the bias voltage source and the BIT/SENSE lines 1 and 2.

It will be seen at this point that by such suitable connection to the various contacts as shown, the FET devices which serve as loads in the circuit of FIG. 1 may be created. Thus, as seen in FIG. 3, when conductor 40 is attached to contact 26, regions 23 and 24 may be made to act as source and drain, and region 20*a* and insulated electrode 29 to act as the channel-defining body and gate, respectively to constitute thereby the load IGFET 11 in the circuit. Similarly, the attachment of conductor 40 to contact 36 will permit utilization of regions 33, 20*b* ad 34 as source, body and drain of IGFET 10, with insulated electrode 39 acting as the body gate 10*a*. Conductive portions 29*a* and 39*a* will connect the respective gates 11*a* and 10*a* to the bias voltage source.

By connecting conductor 42 of BIT/SENSE line 2 to contact 28, regions 24 and 25 serve to define a PN junction, serving as diode 15, and similarly, by connecting conductor 41 of BIT/SENSE line 1 to the contact 38, regions 34 and 35 serve to define another PN junction serving as diode 14.

Figures 5, 6, 7, 8, 9:
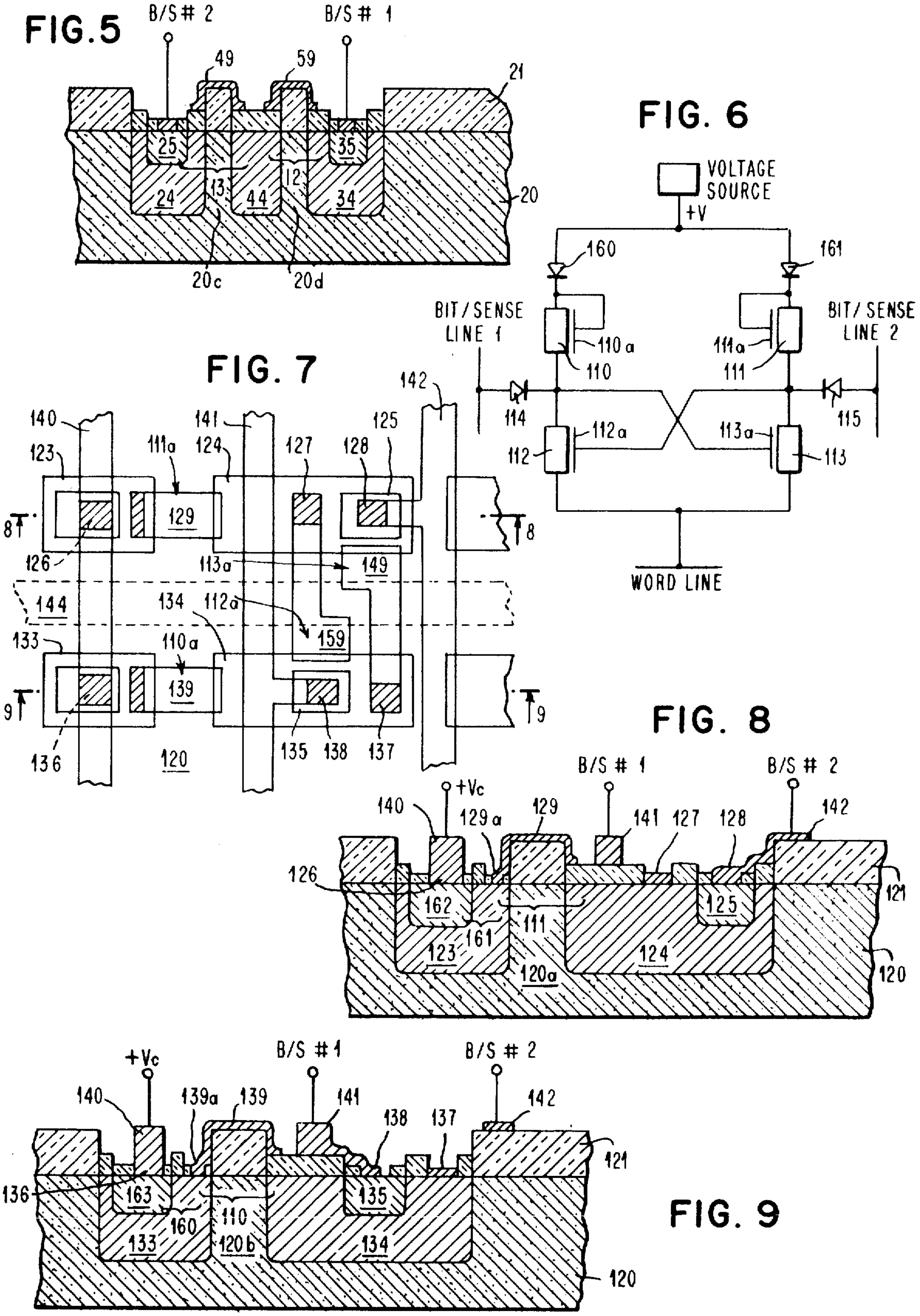
FIG. 5 is a sectional view through the wafer taken along the line 5—5 in FIG. 2 illustrating the formation of the bistable insulated gate field effect transistors and the input/output diodes in the memory cell of the present invention.
FIG. 6 is a schematic diagram of a modification of the memory cell circuit of the present invention, including the combination of a diode and a field effect transistor forming the load.
FIG. 7 is a layout view of a wafer containing the memory cell circuit shown in FIG. 6.
FIGS. 8 and 9 are sectional views through the wafer of FIG. 6 taken along the lines 8—8 and 9—9 respectively.

Turning now to the section shown in FIG. 5, the creation of the bistable devices in the circuit of FIG. 1 will be described. As seen in FIGS. 2 and 5, an additional separate N-type region 44, is diffused in the body 20 between the regions 24 and 34. Contact 44*a* is attached to the surface of region 44. Gate electrodes 49 and 59 are formed over the insulating layer 21 above the respective regions 20*c* and 20*d* of body 20, which are located between the opposite sides of region 44 and the regions 24 and 34, respectively. It will be understood that the region 44 serves as the common WORD LINE and that the regions in this section may be made to act as the bistable IGFETs 12 and 13. Thus, region 24 may be employed as a source, region 44 serves additionally as an individual drain, region 20*c* as a body, and electrode 49 as a gate, thereby constituting the IGFET 13; while region 34 may be employed as a source, region 44 as a drain, region 20*d* as a body and electrode 59 as a gate, thereby constituting IGFET 12.

It will now been seen that if, as in FIG. 2, gate electrode 59 is connected to contact 27, and gate electrode 49 is connected to contact 37, the circuit of FIG. 1 will be completed as then diode 15, formed by the junction between regions 24 and 25, will be connected to the gate of IGFET 12, through contact 27 will the drain and source of IGFETs 11 and 13, respectively, through the region 24. Diode 14, which is defined by the junction between regions 34 and 35, will similarly be connected to the gate of IGFET 13 through contact 37 and to the drain and source of IGFETS 10 and 12 respectively, through the region 34.

Consideration of this wafer arrangement will reveal that by the use of a single additional diffusion step which introduces the P-type regions 25 and 35 into the drain or source regions 24 and 34 of the existing FETS in an IGFET wafer, reduces the number of FETS in the wafer memory cell and thus essentially reduces the areas occupied by each cell. The dimensions of the wafer shown in FIG. 2 may be reduced to 2.5 by 1.8 mils, giving a cell area of approximately 4.5 mil.$^2$ in contrast to the standard six-transistor IGFET memory cell, whose area is approximately 10 mils$^2$.

A modification of the circuit of FIG. 1 is shown in FIG. 6, wherein the FET load is combined with An exponential load by placing diode 160 and 161 in series with the load IGFETS 110 and 111 to obtain a semiexponential load characteristic.

This cell is of advantage over purely FET or Exponential load cells, since it combines the lower power advantage of exponential loads with the FET loads allowing the cell to be operated at lower standby power and permitting reduction of the cell size. Also, the cell can maintain bistability over the entire current range, limited only by "OFF" side leakage current in the lower ranges. With this load arrangement, the diode load will result in a 60 mv. decade offset voltage from the 100 nA. to 10 $\mu$A. range, when standby operation is desirable, and the FET load will be the determining factor at higher currents. Since the drop across the diode contributes to the offset voltage in standby conditions, the size of the FET load can be reduced to permit a smaller cell area. The area of the wafer or chip shown in FIG. 7 may thus be reduced to approximately 5.1 mil$^2$.

Figure 14:
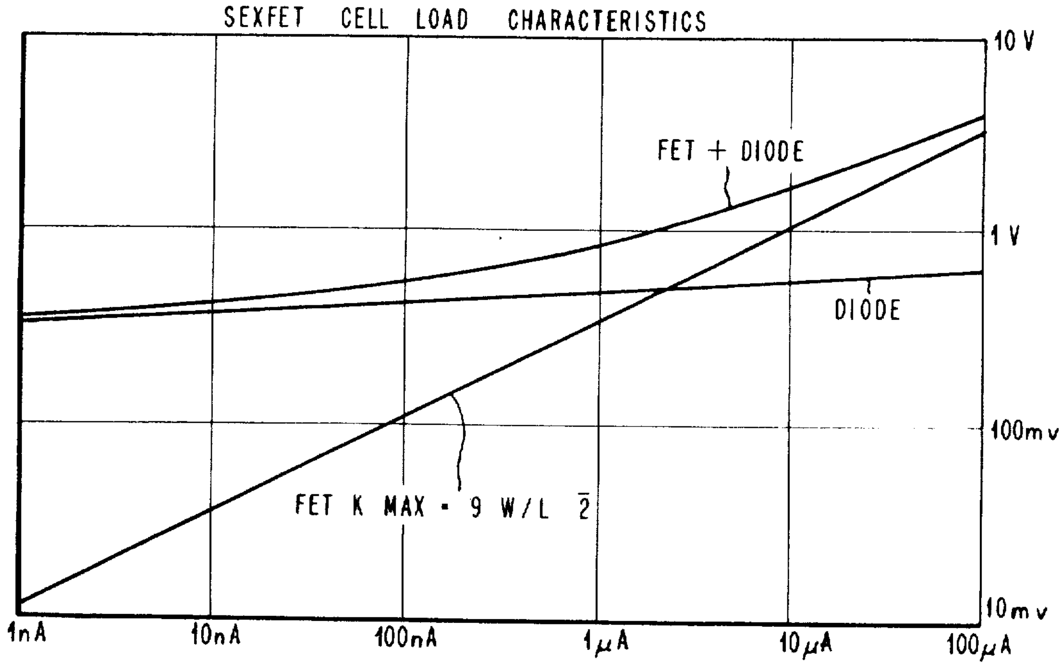
FIG. 14 is a plot of the load characteristics of the memory cell of FIG. 6.

This call operates with a fixed positive supply and in regulated WORD LINE mode in standby condition, such that the Input/output diodes 114 and 115 are not conducting. When the word address switches the WORD LINE negative, the external BIT/SENSE line loads will be connected to the cell through the INPUT/OUTPUT diode 114 and 115. As with the former cell, read operation is carried out by sensing the BIT/SENSE line voltage differences after a wordline is addressed and the write operation should have positive drive or push-pull driving. The load characteristics of this cell are plotted in FIG. 14.

The construction of the cell of FIG. 6 can be seen with reference to FIGS. 7 through 9 wherein parts corresponding generally to those in the initially described embodiment are similarly numbered but preceded by The digit 1. As seen most clearly in the sections in FIGS. 8 and 9, the wafer again comprises a body or substrate 120 of semiconductor material and has regions of opposite conductivity 123, 124 and 133, 134 formed therein by a first diffusion in a conventional manner. In this case, during the second diffusion, in addition to the INPUT/OUTPUT diode regions 125 and 135 formed in the regions 124 and 134, P-type regions 162 and 163 are formed in the respective N-type regions 123 and 133, entirely within their surface areas. Respective contacts 126 and 136 are attached to the surfaces of these regions 162 and 163 through holes in the oxide layer 121, and gate electrodes 129 and 139 are formed over the insulating layer 121 above respective regions 120*a* and 120*b* of body 120. The load is completed by connecting the gate electrodes 129 and 139 to the regions 123 and 133 through conductive portions 129*a* and 139*a*. Then, by connecting the bias voltage electrode 140 to contacts 126 and 136, the interfaces between regions 162 and 123 and between regions 163 and 133 may be made to act as PN junctions, constituting the diodes 161 and 160, respectively, while the regions 123 and 133 may be made to act as the sources, regions 124 and 134 the drains, and regions 120*a* and 120*b* the bodies of the respective load IGFETs 111 and 110, with the electrodes 129 and 139 acting as the gates. The conductive portions 129*a* and 139*a* will then connect the IGFET gates to the outputs of the respective diodes 111 and 110.

The remaining portions of the cell may be constructed in the manner described in connection with the initial embodiment.

Figures 10, 11:
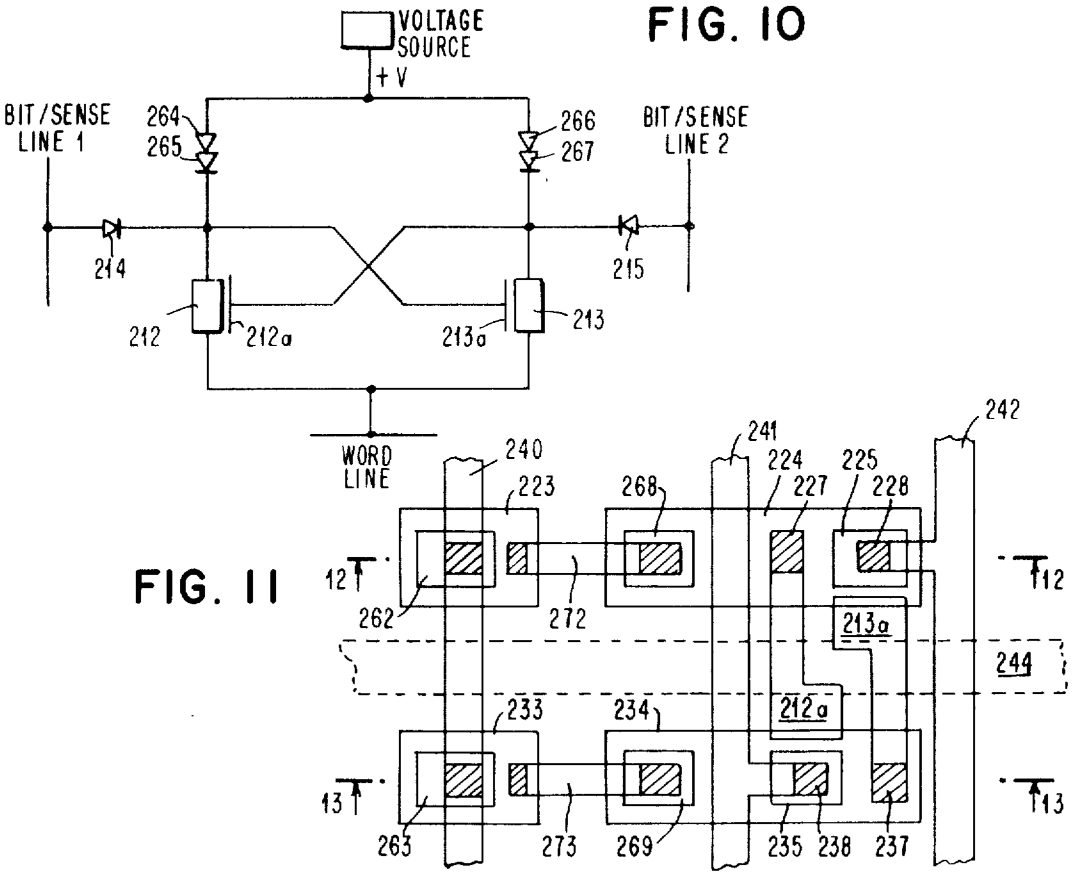
FIG. 10 is a schematic diagram of another modification of the memory cell circuit of the present invention, including two diodes as constituting the load.
FIG. 11 is a layout view of a wafer containing the memory cell circuit shown in FIG. 10.

A further alternate embodiment is shown in FIG. 10 which comprises a load combining the advantage of exponential loads and FET devices by using diode exponential loads in standby condition and a FET load in operating condition. Here dual diodes 264, 265 and 266, 267 are used in the load portion of the cell. The use of these exponential loads permits the cell to operate with a very low standby power requirement. Since the forward current determines the voltage drop across the junction diode and an IGFET gate does not draw current, a bistable cell may be built using exponential loads and FET bistable devices The voltage on the gate of the IGFET on the conducting side of the bistable portion of the cell is determined by the voltage drops across the diodes in the nonconducting leg which is limited by leakage current only. This gate voltage in turn determines the current through the conducting bistable IGFET, thus lowering the voltage across the conducting load diodes. Therefore, the voltage difference between the conducting and nonconducting loads will be a function of the ratio between the cunduction current and the leakage current. Since silicon junction diodes have approximately 60mv./decade voltage excursion, the offset voltage across the two diode loads will be 120mv. for each decade increment in the current ratio which will give satisfactory operation of the cell in the sub-UA ranges.

Figure 15:
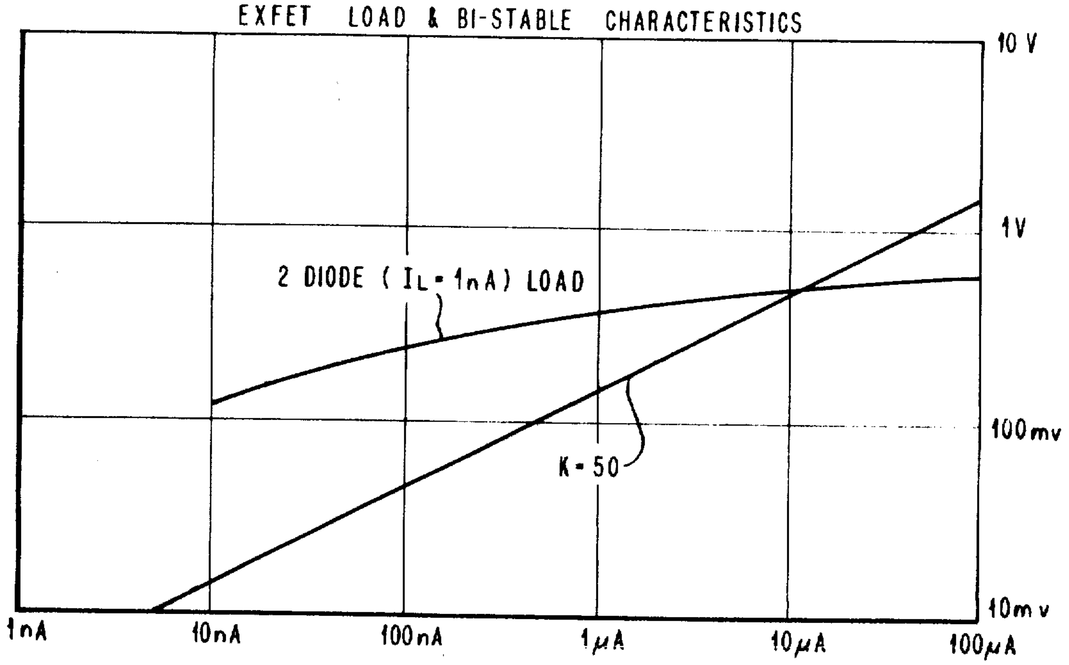
FIG. 15 is a plot of the load characteristics of the memory cell of FIG. 10.

However, the cell will lose its bistability if the current in the loads increases above the point where larger than unity loop gain is not maintained. The maximum operating current of the cell is a function of the bistable gain and it can be seen from the again, of the load characteristic in FIG. 15 that FETS with higher gain will give bistability at higher currents. Cells of this type made with FETS of 5 to 1 ratios will have an area of 4.6 mil$^2$ and will be stable up to 2$\mu$A. When such a cell is switched from standby operating conditions, the exponential loads are replaced by FET loads, so that the above-stated limitations are not applicable. The layout and construction of the cell of FIG. 10 can be seen with reference to FIGS. 11 through 13. Again, the parts corresponding generally to those in the initially described embodiment are similarly numbered, but preceded here by the digit 2.

Figure 12:
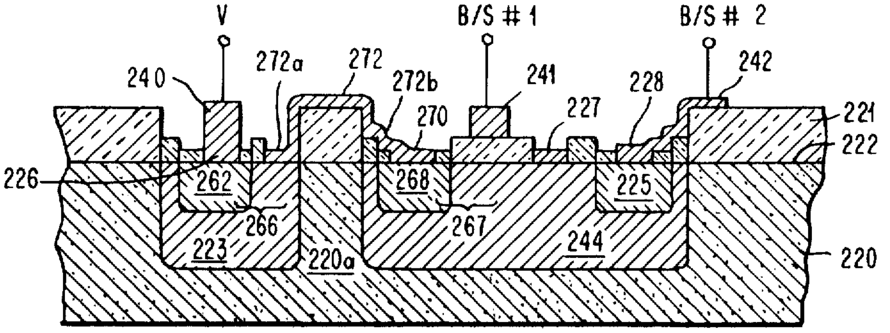
FIGS. 12 and 13 are sectional views through the wafer of FIG. 11 taken along the lines 12—12 and 13—13, respectively.
Figure 13:
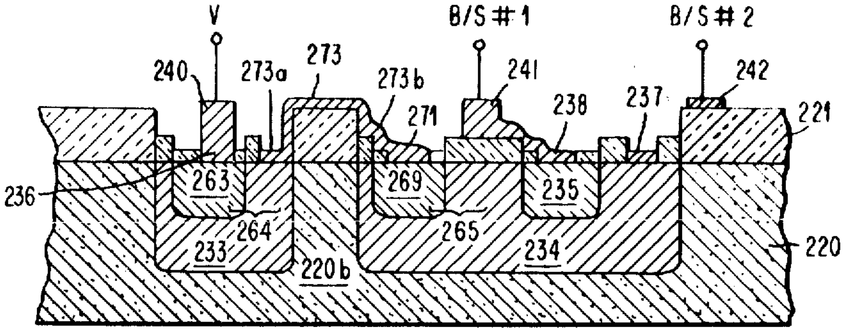

As seen most clearly in the sections in FIGS. 12 and 13, the wafer comprises a body 220 of semiconductor material in which regions of opposite conductivity 223, 224 and 233, 234 are formed by a first diffusion in a conventional manner. In this embodiment during the second diffusion, in addition to the INPUT/OUTPUT diode regions 225 and 235, formed in the regions 224 and 234, P-type regions 268 and 269 are also formed in these respective N-type regions, entirely within their surface areas. As in the previous embodiment, P-type regions 262 and 263 are formed in the respective N-type regions 223 and 233 during the second diffusion step.

Appropriate contacts 226–228 and 236–238 are attached to the surface of the regions 223–225 and 233–235 and, in addition, contacts 270 and 271 are attached to the surfaces of the respective regions 268 and 269. To complete the construction of the dual diode load, electrodes 272 and 273 are formed over the insulating layer 221 above the regions 220*a* and 220*b* in the body 220 and have portions 272*a* and 273*a*, respectively connected to the regions 223 and 233, and portions 272*b* and 273 *b* , respectively connected to the contacts 270 and 271. Now, by connecting the bias voltage electrode 240 to the contacts 226 and 236, the interfaces between regions 262 and 223 and 263 and 233 may be made to act as PN junctions, constituting diodes 266 and 264, respectively, and the regions 268 and 224, and 269 and 234 form PN junctions, constituting diodes 267 and 265. These respective dual diodes are connected by the electrodes 272 and 273, respectively.

It will then be seen that with the use of a second diffusion step, wherein various diodes may be diffused into the source or drain regions of the IGFETs, the standard six-transistor IGFET memory cell wafer may be modified and substantially reduced in size by reducing the number of IGFETs required while achieving diverse operating advantages.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A memory cell comprising:

a. an integrated circuit comprising i. a body (20) of one conductivity type having a planar surface (22);

ii. first, second and third separated regions (24,44,34) of the opposite conductivity type extending into said body from separate areas of said surface;

iii. fourth and fifth regions (25,35) of said one conductivity type extending into said first (24) and third (34) regions, respectively, from areas of said planar surface entirely within the surface areas of said first and said third regions;

iv. a first conductive gate electrode (49) insulated from but over the surface of the portion (20*c*) of said body between said first (24) and second (44) regions;

v. a second conductive gate electrode (59) insulated from but over the surface of the portion (20*d*) of said body between said second (44) and said third (34) regions;

vi. first, second and third contacts (28,44*a*,38) to said fourth (25), second (44) and fifth (35) regions respectively, and fourth and fifth contacts (37,27) between said first gate electrode (49) and said third region (34) and said second gate electrode (59) and said first region (24), respectively, such that said fourth region (25) and said first region (24) define a PN junction, said first region (24), said first gate electrode (49) and said second region (44) define the source, gate and drain of a fist insulated gate field effect transistor (13), said second region (44), said second gate electrode (59) and said third region (34) define the source, gate, and drain of a second insulated gate field effect transistor (12) and said fifth region (35) and said third region (34) define a PN junction; and b. means for connecting a bias source and a load impedance between said first (24) and said third (34) regions.

2. A memory cell as in claim 1, wherein the load impedance comprises:

c. sixth and seventh separated regions (23,33) of the opposite conductivity type, extending into said body (20) from separate areas of said surface (22);

third and fourth conductive gate electrodes (29,39) insulated from but over the surface of said body between said sixth (23) and said first (24) regions and said seventh (33) and said third (34) regions, respectively, such that said sixth region (23), said third gate electrode (29) and said first region (24) define the source, gate and drain of a third insulated gate field effect transistor (11) and said seventh region (33), said fourth gate electrode (39) and said third region (34) define the source, gate and drain of a fourth field effect transistor (10);

e. means connecting said third (29) and said fourth (39) conductive gate electrodes to said sixth (23) and said seventh (33) regions, respectively;

f. sixth and seventh contacts (26,36) to said sixth (23) and said seventh (33) regions, respectively; and g. means connecting said sixth (26) and seventh (33) contacts to said bias source.

3. A memory cell as in claim 1, wherein the load impedance comprises:

c. sixth and seventh separated regions (123,133) of the opposite conductivity type, extending into said body (120) from separate areas of said surface;

d. third and fourth conductive gate electrodes (129,139) insulated from but dispersed over the surface of said body between said sixth (123) and said first (124) regions and said seventh (133) and said third (134) regions, respectively, such that said sixth region (123), said third gate electrode (129) and said first region (124) define the source, gate and drain of a third insulated gate field effect transistor (111), and said seventh region (133), said fourth gate electrode (139) and said third region (134) define the source, gate and drain of a fourth field effect transistor (110);

e. means connecting said third and fourth conductive gate electrodes (129,139) to said sixth (123) and seventh (133) regions respectively;

f. eighth and ninth regions (162,163) of said one conductivity type extending into said sixth (123) and said seventh (133) regions, respectively, from areas of said body surface entirely within the surface areas of said sixth (123) and said seventh (133) regions;

g. sixth and seventh contacts (126, 136) to said eighth (162) and said ninth (163) regions, such said eighth (162) and said sixth (123) regions define a PN junction and said ninth (163) and said seventh (133) regions define a PN junction; and h. means connecting said sixth and seventh contacts (126,136) to said bias source.

4. A memory cell as in claim 1, wherein the load impedance comprises:

c. sixth and seventh separated regions (223, 233) of the opposite conductivity type extending into said body (220) from separate areas of said surface;

d. eighth and ninth regions (262, 263) of said one conductivity type extending into said sixth (223) and said seventh (233) regions, respectively, from areas of said body surface entirely within the surface areas of said sixth and said seventh regions (223,233);

e. 10th and 11th regions (268,269) of said one conductivity type extending into said first and said third regions (224, 234), respectively, from areas of said body surface entirely within the surface areas of said first and said third regions (224,234);

f. sixth and seventh contacts (226,236) to said eighth and said ninth regions (262,263) and means (272,273) connecting said sixth and said seventh regions (223,233) with said 10th and said 11th regions (268,269) such that said eighth and said sixth regions (262,223) and said 10th and said first regions (266,224) define two PN junctions (266,267) in series, and said ninth and said seventh regions (263,233) and said 11th and third regions (269,234) define two Pn junctions (264,265) in series; and g. means (240) connecting said sixth and seventh contacts (226,236) to said bias source.